(12) United States Patent
Stoiber

(10) Patent No.: US 7,694,804 B2
(45) Date of Patent: Apr. 13, 2010

(54) REVOLVING DEVICE FOR A CONVEYOR CHAIN OR A CONVEYOR BELT

(75) Inventor: Dietmar Stoiber, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/085,400

(22) PCT Filed: Jul. 26, 2007

(86) PCT No.: PCT/EP2007/057712

§ 371 (c)(1),
(2), (4) Date: May 22, 2008

(87) PCT Pub. No.: WO2008/015154

PCT Pub. Date: Feb. 7, 2008

(65) Prior Publication Data

US 2009/0166158 A1 Jul. 2, 2009

(30) Foreign Application Priority Data

Aug. 3, 2006 (DE) .................... 10 2006 036 328

(51) Int. Cl.
*B65G 15/60* (2006.01)
(52) U.S. Cl. .................... 198/805; 198/690.1
(58) Field of Classification Search .......... 198/805, 198/690.1, 837
See application file for complete search history.

(56) References Cited

U.S. PATENT DOCUMENTS

| | | | | |
|---|---|---|---|---|
| 3,581,873 | A | * | 6/1971 | Spodig .................. 198/690.1 |
| 5,027,942 | A | | 7/1991 | Wallaart |
| 5,165,527 | A | * | 11/1992 | Garbagnati ............... 198/805 |
| 6,155,406 | A | * | 12/2000 | Garbagnati ............... 198/805 |
| 6,957,734 | B2 | * | 10/2005 | Imai et al. ............... 198/805 |
| 7,131,528 | B1 | * | 11/2006 | Rathgeber et al. ......... 198/805 |

FOREIGN PATENT DOCUMENTS

| | | |
|---|---|---|
| DE | 103 23 910 A1 | 1/2005 |
| DE | 10 2004 023 494 B4 | 12/2005 |
| EP | 1 378 320 A1 | 1/2004 |

\* cited by examiner

*Primary Examiner*—James R Bidwell

(57) ABSTRACT

There is described a revolving device for a conveyor chain or a conveyor belt, wherein at least one magnet exerts an attracting or a repelling force on the conveyor chain and/or the conveyor belt in order, in particular, to reduce wear and tear during high speeds and to cushion vibrations. The magnetic flux is thereby concentrated in such a way by a first flux guide piece that the magnetic flux acts vertically upon an effective surface of a component of the conveyor chain and/or the conveyor belt. In interaction with a second flux guide piece, the return of the magnetic reflux is achieved by of an additional component of the conveyor chain and/or conveyor belt. Thus the magnetic reflux does not occur by way of the first named component, and consequently an optimized exertion of force on the conveyor chain and/or conveyor belt results.

18 Claims, 1 Drawing Sheet

US 7,694,804 B2

REVOLVING DEVICE FOR A CONVEYOR CHAIN OR A CONVEYOR BELT

CROSS REFERENCE TO RELATED APPLICATIONS

This application is the US National Stage of International Application No. PCT/EP2007/057712, filed Jul. 26, 2007 and claims the benefit thereof. The International Application claims the benefits of German application No. 10 2006 036 328.0 DE filed Aug. 3, 2006, both of the applications are incorporated by reference herein in their entirety.

FIELD OF INVENTION

The invention relates to a revolving device for a conveyor chain or a conveyor belt, which for example are used in conjunction with production machines to convey a part being worked on along a production line.

BACKGROUND OF INVENTION

These types devices are subdivided in many cases into at least two subsections, so that a pre-tensioning between the subsections is achieved for example by a spring pressing the two subsections away from each other and thereby pre-tensioning the conveyor chain mechanically. This pre-tensioning is necessary since a device of this nature is subject to high levels of wear and tear, especially at high conveyor speeds. The chain links tend in such cases to vibrate very sharply in some cases while circulating and this means that the smooth movement of the conveyor and or guide rollers of the conveyor chain in the guide profiles provided for the purpose is no longer guaranteed and the wear and tear is increased as a result. The pre-tensioning of the two subsections mentioned above acts through a pre-tensioning of the conveyor chain against any vibrations which might occur, but too great a pre-tensioning can even increase the wear.

DE 103 23 910 A1 proposes a magnetic chain guide for conveyor chains in which the magnets are provided for creation of a magnetic field in order to exert a magnetic force on the chain and thereby to attract the latter towards the guide rail. This enables undesired vibrations of the conveyor chain to be effectively damped down, so that under some circumstances even a pre-tensioning of the chain is unnecessary and the revolving device can thus be designed in one piece.

Patent application DE 10 2004 023 B4 discloses is a chain guide for an endlessly circulating conveyor chain. In such case the chain elements have conveyor rollers and guide rollers, with the conveyor rollers moving items along conveyors and the guide rollers being guided in a guide slot. The guide rollers are supported in such cases by means of a shaft bolt which protrudes through the guide rollers. In order to damp down vibrations of the chain magnets are provided at the base of the slot profile which act on the shaft bolts and thereby attract the chain links towards the base of the slot profile. In the proposed device the magnetic circuit is made via an air gap above the shaft bolts with the shaft bolts also directing and the field reflux back the magnets.

SUMMARY OF INVENTION

An underlying object of the invention is now to specify a revolving device for a conveyor chain or a conveyor belt which develops the said prior art and especially optimizes the exerting of magnetic force on the conveyor chain or the conveyor belt.

The object is e.g. achieved by a revolving device for a conveyor chain or a conveyor belt with
  at least one magnet for exerting a magnetic force on the conveyor chain or the conveyor belt,
  at least one first and one second flux guide piece for concentrating a magnetic flux generated by the magnets, with the first flux guide pieces concentrating the magnetic flux so that the magnetic flux essentially moves vertically to and through an effective surface of a component of the conveyor chain of the conveyor belt able to be magnetically attracted or repelled, and the second flux guide piece being arranged such that a magnetic reflux from the component to the magnet essentially does not occur through the component but via a further component of the conveyor chain or of the conveyor belt and the second flux guide piece.

The invention starts in this case from the idea that the avoidance of a magnetic reflux via the components into which the inward flux is also injected leads to an effective suppression of a stray field between the magnetic poles. This avoids the component having to be subdivided into two magnetic effective surfaces, namely into one for the inward flux and one for the reflux. The result of such a subdivision is that the magnetically-used effective surface would only amount to a part of the available effective surface. In practice rather small available effective surfaces occur frequently, such as for example the end face surfaces or free ends of shaft bolts which in particular carry guide rollers. With these types of small effective surfaces in particular the guidance of the reflux via another component is very advantageous.

In accordance with the invention a magnetic circuit is consequently embodied which for example uses the end face surface of a component, e.g. of a bolt, for the magnetic attraction, with the magnetic flux being injected in a unipolar manner in a flux direction into the component, essentially vertical to an effective surface of the component such as for example an end face surface. The reflux, i.e. the completion of the magnetic circuit, occurs in such cases not via the component but via a further component of the device, for example via the chain elements which are embodied as chain wagons and/or via the conveyor rollers. The first and second flow guide pieces are provided for the desired guidance of the magnetic field. The flux guide pieces especially feature a remagnetizable iron material. Thus the magnetic field generated by the magnet can be guided by the flux guide pieces and especially concentrated in order to exert a large magnetic force on the components of the revolving device. The fact that the magnetic field is introduced at right angles to the effective surface of the component and is introduced into the components with great strength allows in conjunction with the second flux guide piece the formation of a magnetic circuit in which stray fluxes are avoided and the magnetic reflux is not guided via the component.

An optimized arrangement location especially for the second flux guide piece which is designed to help shape the reflux of the magnetic field to the magnets can be found by the person skilled in the art for example using a spatial magnetic field measurement if they change the arrangement of the flux guide pieces in such cases step-by-step until they establish a magnetic reflux practically completely outside the location of the component. It is also possible to incorporate the constructive layout of the revolving device and in such cases to exploit available components of the device for the reflux, such as the chain links, guide rollers or conveyor rollers already mentioned for example. In addition a device can also comprise side walls, for example side guide profiles to guide rollers. These types of side walls, which can also be used on their upper side as conveyor tracks for conveyor rollers, are likewise considered as further components for guiding the reflux.

An inventive revolving device can be used to especially great advantage in production machines and machine tools. A sensor in this case advantageously looks after the early detection of wear and tear, for example by measuring the magnetic field which changes if there is wear and thereby if the arrangement geometry is changed.

Advantageously the inventive revolving device is driven in a production machine or machine tool by means of the electric drive which for its part is controlled via a current converter. In conjunction with a sensor for detecting wear and tear, the current converter can control the drive of the inventive and revolving device such that for example, depending on currently detected wear, the device influences the magnetic field which acts on the device in order to achieve an improved running of the device. In these cases electromagnets can be provided to generate the magnetic field and are controlled by the current converter as a function of the signal of the wear sensor in order to generate a variable magnetic field adapted to the current wear state.

Advantageously the effective surface on which the magnetic force acts is a surface of a guide roller or a conveyor roller of the revolving device.

Guide rollers and conveyor roller are practically always present in revolving chain or belt devices and can thus be used separately or jointly as the effective surface.

The guide roller is advantageously supported by means of a bolt on the conveyor chain or on the conveyor belt and the effective surface is a free end of the bolt.

As an alternative or in addition to the direct effect of the magnetic force on the guide roller, a component is used in this case, namely the bolt, which is intended for holding the guide roller. The bolt in this case, by comparison with the guide roller itself, has a larger and thereby more favorable effective surface, preferably a free face end of the bolt which can be embodied as a flat circular surface.

In an especially advantageous embodiment of the invention at least two magnets are provided below the conveyor chain or the conveyor belt, with the first flux guide piece being arranged between the at least two magnets. Furthermore in such cases at least two flux guide pieces, again arranged below the conveyor chain or the conveyor belt, are provided so that the following arrangement sequence of these magnetically effective components is produced in a type of sandwich: Second flux guide piece—magnet—first flux guide piece—magnet—second flux guide piece.

This makes the embodiment of a symmetrical magnetic circuit possible. The further components via which the reflux is guided include for example side walls of the device which, because of the symmetrical layout of the magnetic circuit, receive the same the magnetic polarity so that no undesired stray flux occurs.

The at least two magnets are preferably arranged at the same height and generate an opposingly directed magnetic field in each case.

In this case for example the North poles of the magnets are opposite each other and inject a magnetic field into the first flux guide piece. The embodiment of the magnetic circuit has especially good symmetry in such cases.

In a further preferred embodiment the first flux guide piece which is arranged between the two magnets projects above the magnets so that a first air gap between the first flux guide piece and the component is smaller than a second air gap between the magnets and the component.

The first flux guide piece in this case is located relative to the magnetic field symmetry at a central position and in this case acts as a magnetic opposite pole for the further component via which the magnetic reflux is symmetrically guided back. The small air gap between the first flux guide piece and the component in this case leads practically to the influx of the entire field generated by the magnets so that stray fluxes are effectively avoided.

In a further especially preferred embodiment the invention is applied to a chain guide for an endlessly circulating conveyor chain for a machine for working on plate-shaped workpieces. This type of revolving a device comprises conveyor rollers and guide rollers arranged on chain elements, at least one guide rail arranged on a machine frame of the machine along at least one section of the conveyor chain, and which features two conveyor tracks spaced from each other for the conveyor rollers of the chain elements and in between a guide profile into which the conveyor rollers of the chain elements penetrate which are supported on bolts protruding on the chain elements passing through the guide rollers, with the conveyor chain being diverted via chain wheels of which at least one is embodied as a drive chain wheel. The at least two magnets, the first flux guide piece and the at least two second flux guide pieces are arranged on the base of the slot profile of the guide rail. In this case the first flux guide piece is arranged between the at least two magnets so that a sandwich arrangement is produced as follows on the base of the slot profile in the horizontal direction: Second flux guide piece—magnet—first flux guide piece—magnet—second flux guide piece.

The at least two magnets are arranged at the same height and each generate an opposing magnetic field. The component into which the injection of the magnetic flux takes place is the bolt, with the effective surface being a free end of the bolt. This free end penetrates into the slot profile.

The magnetic reflux is guided via a further component which includes the chain elements, the conveyor rollers and a side wall of the slot profile.

In this embodiment the magnetic field is injected in a unipolar fashion into the bolt of the guide roller by means of a symmetrical magnetic circuit. The magnetic circuit in this case is symmetrical to a central plane which extends in parallel to the direction of circulation of the transport chain and which lies in the middle of the chain elements which are embodied as chain wagons. The slot profile features side walls which are symmetrical in relation to the central plane via which the magnetic reflux is eventually guided to the second flux guide pieces and from there back to the magnets. These side walls have the same magnetic polarity which prevents an undesired stray flux. The first flux guide piece forms the magnetic opposite pole to the side walls, with the first flux guide piece being arranged centrally in the middle between the side walls of the slot profile and forming a small air gap to the free end face of the bolt. The first flux guide piece in this case preferably has as small a surface as possible in order to present a small guide value for a disruptive magnetic stray flux and to concentrate the magnetic flux as well as possible.

In a preferred embodiment the at least two magnets, the first flux guide piece and the at least two second flux guide pieces are arranged in a entry area of the conveyor chain in at least one chain wheel, especially in the drive wheel.

The direction of the incoming or outgoing chain is changed at the chain wheel. The greater is the speed with which the chain moves inwards or outwards, the greater are the centrifugal forces occurring in this case at the chain wheel and acting on the chain. The centrifugal forces cause an undesired oscillation and vibration of the chain. The inventive arrangement of the magnets, the first and the second flux guide pieces ensures in such cases that there is an effective damping of these vibrations in the especially critical area of the chain entry.

As an alternative or in addition the magnets, the first and the second flux guide pieces can also be arranged in an outgoing area of the chain from the chain wheel in order to similarly damp down undesired oscillations resulting from the centrifugal forces occurring.

Furthermore the magnets, the first and the second flux guide pieces can be arranged in an area of conveyor chain circulation which runs in a straight line. In these parts of the circulation paths which run in a straight line the chain also tends, especially at high conveyor speeds, towards undesired oscillations which can be countered by this embodiment.

BRIEF DESCRIPTION OF THE DRAWINGS

Two exemplary embodiments of the invention are presented in greater detail below.

The figures show.

DETAILED DESCRIPTION OF INVENTION

Figure 1:
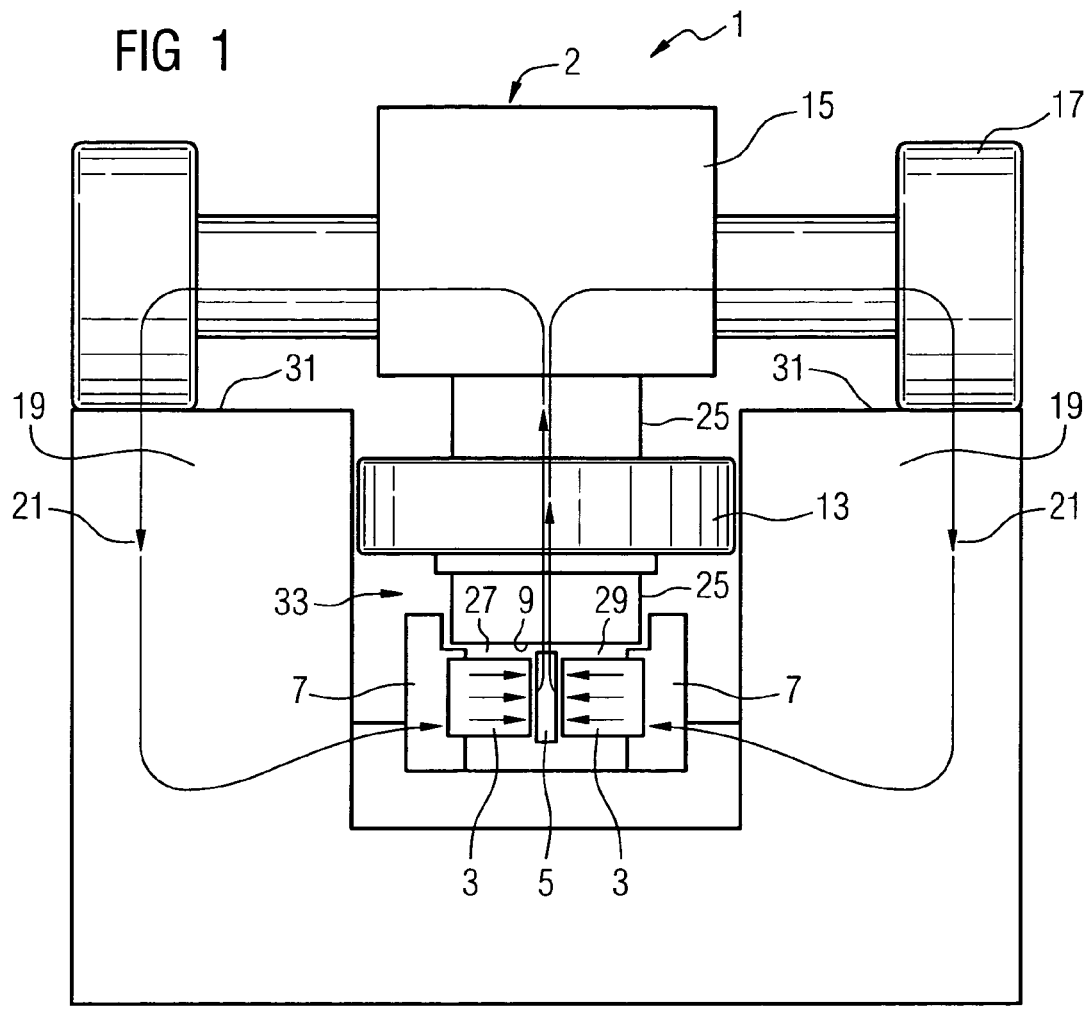
FIG. 1 an inventive revolving device for a conveyor chain, with the chain links being embodied as chain wagons and being guided by means of a guide wheel in a slot profile of a guide rail, and FIG. 2 a further embodiment of a revolving device in which the magnetic circuit features only one magnet and the magnetic reflux is completed via the chain elements.

FIG. 1 shows an inventive revolving device for an endlessly circulating conveyor chain. The view in this case shows a cross section through a guide rail of the device which features a slot profile 33 as well as side walls 19 of which the upper surfaces form a conveyor track 31 for conveyor rollers 17 of the conveyor chain 2.

The direction of conveyance of the conveyor chain 2 points in FIG. 1 into the plane of the drawing. The chain elements 15 of the transport chain 2 are embodied as chain wagons to which guide roller 13 are attached by means of bolts 25. The bolts project through the guide rollers 13 in this case. Along the conveyor path of the conveyor chain 2 these are guided by means of the guide rollers 13 in the slot profile 33 of the guide rail.

To exert a magnetic force on the conveyor chain for suppressing undesired oscillations at least two magnets 3, a central first flux guide piece as well as at least two second flux guide pieces 7 are arranged on the base of the slot profile 33. The arrangement of the described elements takes the form of a sandwich, with between the second flux guide pieces 7 the magnets following in each case directed inwards and the first flux guide piece 5 being arranged in the center of the sandwich between the magnets 3. The magnets 3 in this case point with the same magnetic poles towards the first flux guide piece 5. The first flux guide piece 5 is embodied narrower by comparison with the magnets 3 and has a smaller surface. By means of the first flux guide piece 3 the magnetic flux of the magnets 3 is concentrated and directed vertically onto an effective surface 9 of the bolt 25. The effective surface 9 is in this case a free face end of the bolt 25 which projects from the guide roller 13. The magnetic flux from the first flux guide piece 5 enters via a first air gap 29 into the effective surface 9 of the bolt 25. This first air gap 29 is smaller than a second air gap which is formed between the magnets 3 and the effective surface 9. This results in a smaller magnetic resistance between the first flux guide piece 5 and the bolt 25 so that the magnetic field generated by means of the magnet 3 passes as completely as possible via the first flux guide piece 5 and the first air gap 29 to the bolt 25. The second flux guide pieces 7 are used to guide and concentrate a magnetic reflux 21 which in the present embodiment is produced by the chain elements 15, the conveyor rollers 17 and the side walls 19. The stronger the magnetic field generated by the magnets 3 and the more precisely the right angle to the effective surface 9 is adhered to, the better and more completely can the magnetic reflux 21 occur via the chain elements 15, the conveyor roller 17 and the side walls 19 and, without a magnetic reflux being produced via the effective surface 9 of the bolt. In this way the magnetic forces able to be generated by the inventive arrangement on the conveyor chain can be optimized.

The magnetic flux for attracting the chain wagons is consequently generated symmetrically by least two magnets which can be embodied as permanent magnets. A magnetic unit comprising the magnets 3, the first flux guide piece 5 and also the second flux guide pieces 7 can be formed. These types of magnetic units can be arranged alongside each other along the conveyor path of the conveyor chain 2 in order to obtain a magnetic attraction of the conveyor chain over a desired length of the conveyor path. A grouping together of these types of unit to extend the route along which a magnetic attraction is exercised on the conveyor chain 2 is also sensible since in the case of using permanent magnets these are subjected to a danger of breaking beyond a specific magnetic pole length. For safely avoiding this type of danger of breakage for example the magnetic units can be selected in which the magnetic pole lengths of the magnets do not exceed appr. 6 cm.

The first flux guide piece 5 ensures that the magnetic field is condensed and thus ensures a high magnetic flux density. A high value is required in this case because the force of magnetic attraction increases in relation to the square of the magnetic flux density. A polarization of the magnets in accordance with the invention should be ensured so that the same pole of the magnets always points towards the first flux guide piece 5.

The magnetic flux which is introduced via the bolts 25 is directed via the chain elements 15, the conveyor rollers 17 and the side walls 19 through the second flux guide pieces 7 back to the magnets 3. In such cases the flux density of the magnetic reflux 21, because of the large effective surfaces of the reflux components chain elements 15, conveyor roller 17 and side walls 19 is reduced by comparison with the flux density of the magnetic field introduced into the bolts 25, so that unintended force effects of the magnetic reflux 21 are kept low.

The sandwich arrangement of the magnetic unit can for example be established by the second outer flux guide pieces 7 being connected transversely to each other by a span bolt. The first flux guide piece 5 can then be threaded onto this span bolt.

The fundamental principles of the inventive design shown include the use of the face surface of a free end of the bolt 25 as the effective surface 9. The magnetic reflux 21 is routed for optimizing the force exerted on the conveyor chain via other surfaces which essentially do not belong to the bolt 25 back to the magnets 3. The magnetic circuit is thus established symmetrically around the flux guidance generated by means of the first flux guide piece 5. The magnetic reflux 21 is guided back partly in the effective surfaces between the second flux guide pieces 7 arranged at the side and partly via the structure of the guide rail. Since the magnetic flux density in the return path is low as a result of the comparatively large surfaces of the return components involved, only a small force effect is produced on the surfaces involved in the return path.

Where a number of magnetic units are connected in series, the first flux guide pieces 5 at the start and end of the magnetic units connected in series should be set at a lower height by comparison with the delimiting units, advantageously taper off in a radius towards the end. This leads to an enlargement of the first air gap 29 in the start and end section of the magnetic units connected in series. A latching force can thus be reduced which the series connection of magnetic units exerts in its start and end section on the chain wagons.

Figure 2:
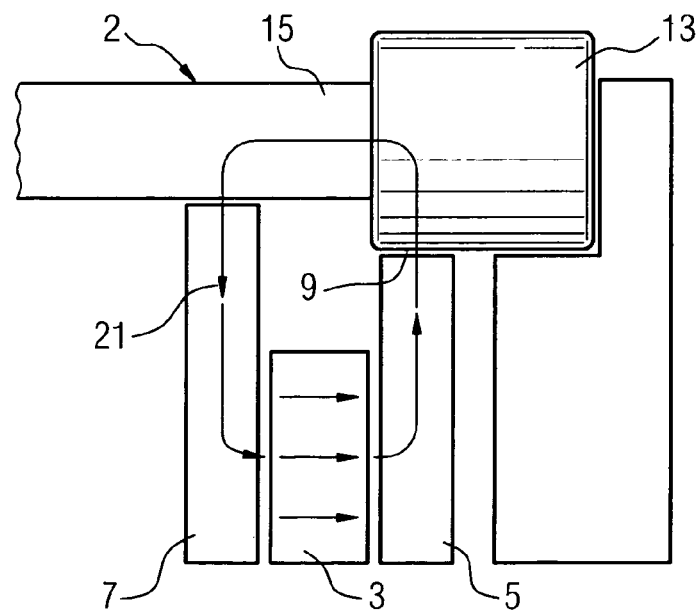

FIG. 2 shows a further exemplary embodiment of an inventive revolving device 1.

In this embodiment only one magnet 3, preferably a permanent magnet, as well as a first flux guide piece 5 and a second flux guide piece 7 are employed to introduce a magnetic flux into the effective surface 9 of a guide roller 13 or a conveyor roller of the revolving device 1. The magnetic flux produced by the magnet 3 is concentrated by means of the first flux guide piece 5 and enters via an air gap vertically through the effective surface 9 into the guide roller 13 or into the conveyor roller and is guided from there via the chain elements 15 as magnetic reflux 21 by means of the second flux guide piece 7 back to the magnet 3. In this case too it is a matter of using the flux guide pieces 5 and 7 to embody the magnetic flux such that the magnetic reflux back to the magnet 3 does not pass via the effective surface 9 but via at least one further component of the device 1. In the present exemplary embodiment at least the chain elements 15, which are preferably embodied as a chain wagons, are used for this purpose. It would also be conceivable to direct the magnetic reflux from the chain elements to a further guide roller located on the left side but not shown in greater detail, from there into a side wall of the guide rail and from there by means of the second flux guide piece 7 back to the magnet 3.

In summary the invention can be described as follows:

A revolving device for a conveyor chain or a conveyor belt is proposed in which at least one magnet exercises a force or attraction or repulsion on the conveyor chain or the conveyor belt in order especially to reduce the wear and tear at high conveyor speeds and to damp down vibrations. The magnetic flux in this case is concentrated by means of a first flux guide piece such that it acts at right angles to an effective surface of a component of the conveyor chain or of the conveyor belt. In interaction with a second flux guide piece for returning the magnetic reflux via a further component of the conveyor chain or of the conveyor belt the return of the magnetic reflux is achieved so that it does not pass via the first-mentioned component, which leads to an optimized exertion of force on the conveyor chain or on the conveyor belt.

The invention claimed is:

1. A revolving device for a conveyor chain or a conveyor belt, comprising:
   at least one magnet for exerting a magnetic force on the conveyor chain or the conveyor belt; and
   at least one first flux guide piece and at least one second flux guide piece for concentration of a magnetic flux generated by the magnet, wherein
   the first flux guide piece concentrates the magnetic flux such that the magnetic flux moves essentially vertically to and through an effective surface of a component of the conveyor chain or of the conveyor belt able to be magnetically attracted or repelled, and wherein
   the second flux guide piece being arranged such that a magnetic reflux from the component to the magnet essentially does not occur through the component but via a further component of the conveyor chain or of the conveyor belt and the second flux guide piece.

2. The revolving device as claimed in claim 1, wherein the effective surface is a surface of a guide roller or a conveyor roller of the revolving device.

3. The revolving device as claimed in claim 1, wherein a guide roller of the revolving device is held by a bolt onto the conveyor chain or onto the conveyor belt, and wherein
   the effective surface is a free end of the bolt.

4. The revolving device as claimed in claim 1, wherein at least two magnets are arranged underneath the conveyor chain or the conveyor belt, wherein the first flux guide piece is arranged between the at least two magnets, and wherein at least two second flux guide pieces are arranged below the conveyor chain or the conveyor belt, such that the following arrangement sequence is produced: second flux guide piece—magnet—first flux guide piece—magnet—second flux guide piece.

5. The revolving device as claimed in claim 2, wherein at least two magnets are arranged underneath the conveyor chain or the conveyor belt, wherein the first flux guide piece is arranged between the at least two magnets, and wherein at least two second flux guide pieces are arranged below the conveyor chain or the conveyor belt, such that the following arrangement sequence is produced: second flux guide piece—magnet—first flux guide piece—magnet—second flux guide piece.

6. The revolving device as claimed in claim 3, wherein at least two magnets are arranged underneath the conveyor chain or the conveyor belt, wherein the first flux guide piece is arranged between the at least two magnets, and wherein at least two second flux guide pieces are arranged below the conveyor chain or the conveyor belt, such that the following arrangement sequence is produced: second flux guide piece—magnet—first flux guide piece—magnet—second flux guide piece.

7. The revolving device as claimed in claim 4, wherein the at least two magnets are arranged at the same height and create an opposingly directed magnetic field in each case.

8. The revolving device as claimed in claim 4, wherein the at least two magnets create an opposingly directed magnetic field related to each other.

9. The revolving device as claimed in claim 7, wherein the first flux guide piece arranged between the two magnets projects above the height of the magnets, so that a first air gap between the first flux guide piece and the components is smaller than a second air gap between the magnets and the components.

10. The revolving device as claimed in claim 8, wherein the first flux guide piece arranged between the two magnets projects above the height of the magnets, so that a first air gap between the first flux guide piece and the components is smaller than a second air gap between the magnets and the components.

11. The revolving device as claimed in claim 1, wherein the revolving device is a chain guide for an endlessly circulating conveyor chain at a machine for processing plate-type workpieces in a production line.

12. The revolving device as claimed in claim 1, wherein
   the revolving device is a chain guide for an endlessly circulating conveyor chain, wherein
   conveyor rollers and guide rollers are arranged on chain elements, wherein
   at least one guide rail is arranged on a machine frame of the machine along at least one section of the revolving path of the conveyor chain, heaving two tracks for the conveyor rollers of the chain elements separated from each other and between them a slot profile, into which the guide rollers of the chain elements penetrate, which are supported on bolts protruding from the chain elements passing through the guide rollers, with the conveyor chain being diverted over chain wheels of which at least one is embodied as a drive chain wheel, with at least two magnets are arranged on the base of the slot profile of the guide rail, the first flux guide piece is arranged between the two magnets and on the base of the slot profile of the guide rail, and at least two second flux guide pieces are provided and arranged on the base of the slot profile of the guide rail, such that the following arrangement sequence on the base of the slot profile is produced: second flux guide piece—magnet—first flux guide piece—magnet—second flux guide piece.

13. The revolving device as claimed in claim 12, wherein the at least two magnets are arranged at the same height, creating an opposingly directed magnetic field in each case, wherein the component is the bolt, wherein the effective surface is a free end of the bolt, and wherein the further components comprise the chain elements, the conveyor rollers and a side wall of the slot profile.

14. The revolving device as claimed in claim 12, wherein the at least two magnets, the first flux guide piece and the at least two second flux guide pieces are arranged in an entry area of the conveyor chain in at least one chain wheel.

15. The revolving device as claimed in claim 12, wherein the at least two magnets, the first flux guide piece and the at least two second flux guide pieces are arranged in an entry area of the conveyor chain in the drive wheel.

16. The revolving device as claimed in claim 12, wherein the at least two magnets, the first flux guide piece and the at least two second flux guide pieces are arranged in an exit area of the conveyor chain comprising at least one chain wheel.

17. The revolving device as claimed in claim 12, wherein the at least two magnets, the first flux guide piece and the at least two second flux guide pieces are arranged in an exit area of the conveyor chain comprising a drive wheel.

18. The revolving device as claimed in claim 12, wherein the at least two magnets, the first flux guide piece and the at least two second flux guide pieces are arranged in a further area of the circulation path of the conveyor chain, wherein the circulation path runns in essentially a straight line in this further area.

* * * * *